United States Patent
Ajioka et al.

(10) Patent No.: US 8,693,143 B2
(45) Date of Patent: Apr. 8, 2014

(54) SUSPENSION WITH HIGH CONDUCTIVITY GROUND LAYER FOR MICROWAVE SIGNAL TRANSMISSION LINE, FOR MAGNETIC HEAD SLIDER

(75) Inventors: Eriko Ajioka, Tokyo (JP); Yoshikazu Soeno, Tokyo (JP)

(73) Assignee: TDK Corporation, Tokyo (JP)

( * ) Notice: Subject to any disclaimer, the term of this patent is extended or adjusted under 35 U.S.C. 154(b) by 56 days.

(21) Appl. No.: 13/302,658

(22) Filed: Nov. 22, 2011

(65) Prior Publication Data

US 2013/0128382 A1    May 23, 2013

(51) Int. Cl.
*G11B 5/48* (2006.01)
(52) U.S. Cl.
USPC .......................................................... 360/244
(58) Field of Classification Search
None
See application file for complete search history.

(56) References Cited

U.S. PATENT DOCUMENTS

| 2007/0188927 A1* | 8/2007 | Zhu et al. | 360/245.3 |
| 2010/0208379 A1* | 8/2010 | Ikeda et al. | 360/59 |

FOREIGN PATENT DOCUMENTS

| JP | A-H09-54930 | 2/1997 |
| JP | A-2005-11387 | 1/2005 |
| JP | A-2010-73297 | 4/2010 |

OTHER PUBLICATIONS

Zhu et al. "Microwave Assisted Magnetic Recording" *IEEE Transactions on Magnetics*, vol. 44, No. 1, pp. 125-131 (Jan. 2008).
Wang et al. "Media damping constant and performance characteristics in microwave assisted magnetic recording with circular ac field," *Journal of Applied Physics*, 105 (2009).

* cited by examiner

Primary Examiner — David D Davis
(74) Attorney, Agent, or Firm — Posz Law Group, PLC

(57) ABSTRACT

A suspension is configured to support a magnetic head slider having a recording head element for recording to a magnetic recording medium and a microwave generating element that applies a high-frequency magnetic field to the magnetic recording medium when recording to the magnetic recording medium is conducted by the recording head element. The suspension includes a flexure that supports the magnetic head slider, and a microwave signal transmission line and a recording signal transmission line that are supported by the flexure. The microwave signal transmission line is connected to the microwave generating element and configured to transmit microwave signals for generating the high-frequency magnetic field, the recording signal transmission line being connected to the recording head element and configured to transmit recording signals. The flexure has a main body part, a support part for the magnetic head slider, and a pair of arm parts that links the main body part and the support part. The recording signal transmission line is supported between the main body part and the support part by a separate support part separated from the flexure, the microwave signal transmission line is supported between the main body part and the support part by at least one of the pair of arm parts, and a portion of the one of the arm parts that supports the microwave signal transmission line has a lamination structure in which an insulating layer that supports the microwave signal transmission line on one surface and a substrate whose portion opposing the other surface of the insulating layer has conductivity are laminated.

13 Claims, 10 Drawing Sheets

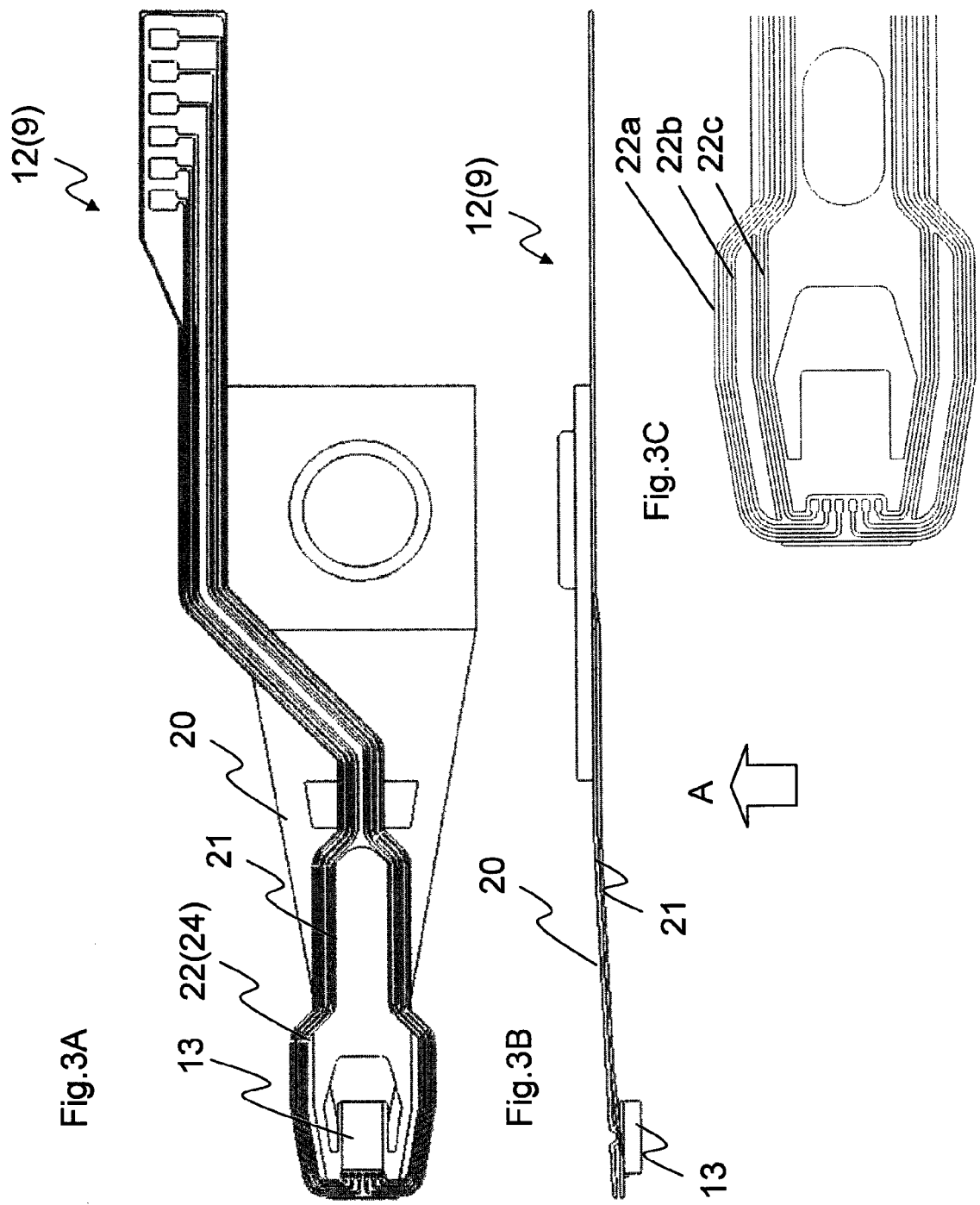

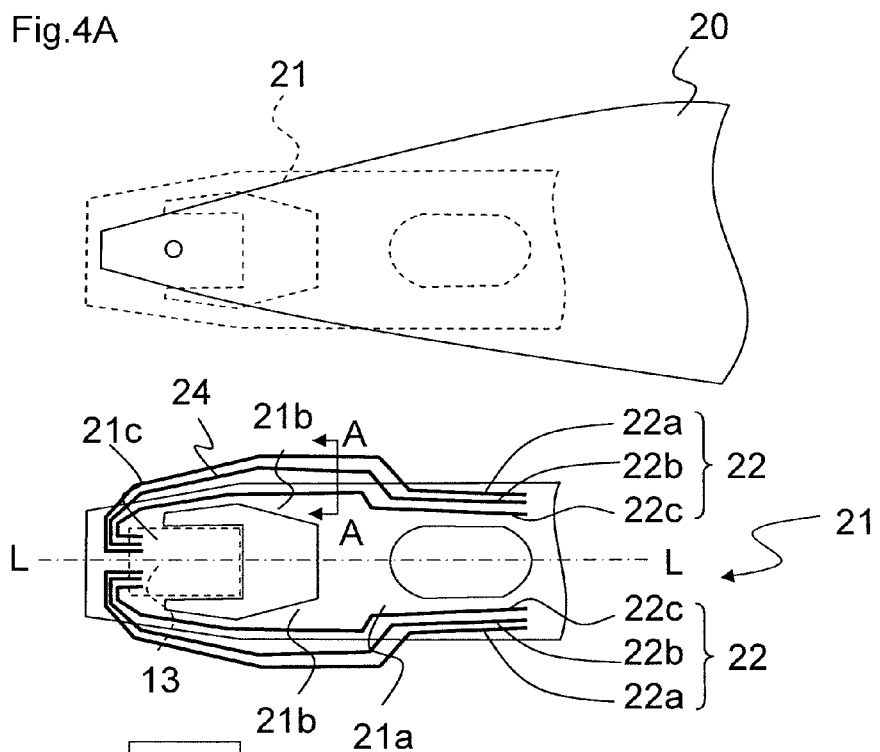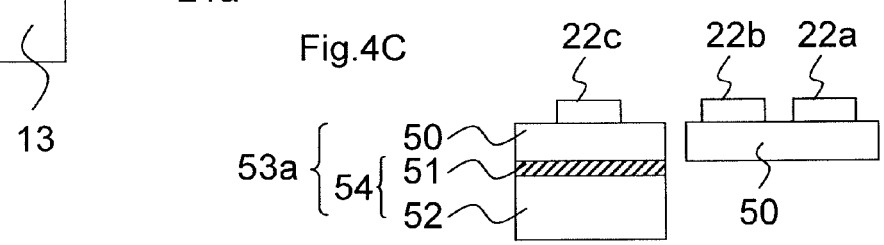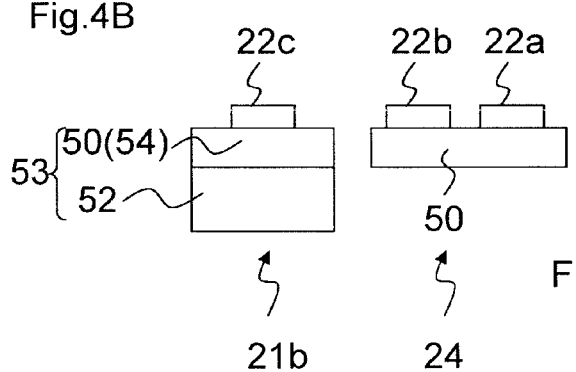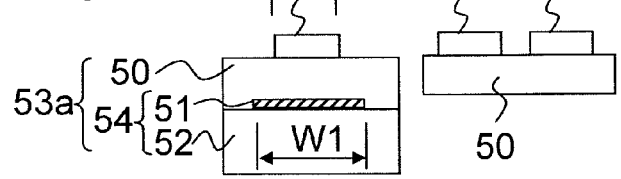

SUSPENSION WITH HIGH CONDUCTIVITY GROUND LAYER FOR MICROWAVE SIGNAL TRANSMISSION LINE, FOR MAGNETIC HEAD SLIDER

BACKGROUND OF THE INVENTION

1. Field of the Invention

The present invention relates to a suspension that supports a magnetic head slider, and more particularly relates to a support structure of a microwave signal transmission line on the suspension that is configured to mount a magnetic head for microwave assisted recording.

2. Description of the Related Art

There is a demand for improvement in recording density of magnetic disk devices that are magnetic recording devices. In order to ensure the required signal quality (signal to noise (S/N) ratio) in high density recording, there is a need to reduce the size of magnetic particles that configure a magnetic recording medium in conjunction with the improvement of surface recording density. However, the magnetic particles having reduced size are more likely to cause a magnetization disappearance due to heat fluctuation. In order to prevent this problem and maintain a stable recording state, there is a need to increase magnetic anisotropy energy of the magnetic particles. When a material with high magnetic anisotropy energy is used, coercive force of the recording magnetic recording medium is increased, and therefore, a strong recording magnetic field becomes necessary to record to the magnetic recording medium. Meanwhile, the intensity of magnetic fields generated by a recording head element is restricted by the material and the shape of the recording head element, which makes recording difficult.

In order to resolve this technical problem, energy assisted recording has been proposed in which, at the time of recording, supplemental energy is applied to a magnetic recording medium to lower effective coercive force. A recording system using a microwave magnetic field as a supplemental energy source is called microwave assisted magnetic recording (MAMR). The following references should be referred: J. G. Zhu and X. Zhu, 'Microwave Assisted Magnetic Recording', The Magnetic Recording Conference (TMRC) 2007 Paper B6 (2007), and Y. Wang and J. G. Zhu, 'Media damping constant and performance characteristics in microwave assisted magnetic recording with circular ac field' JOURNAL of Applied Physics (2009).

In microwave assisted magnetic recording, a system of supplying a microwave magnetic field by a microwave oscillator arranged in a tip end of a magnetic head, and a system of supplying microwave signals (power), the signals being supplied from a microwave signal generation circuit that is independent from the magnetic head, to a microwave generating element are known. The latter is called separate excitation system microwave assisted magnetic recording. With this system, because microwave signals (power) are supplied to a microwave generating element that is formed near a recording head element of a magnetic head slider, there is a need to provide a microwave transmission line onto a head gimbal assembly.

The head gimbal assembly is formed mainly with the magnetic head slider and a suspension. The suspension is formed with a signal transmission line connected to the magnetic head slider, a flexure that supports the magnetic head slider and the signal transmission line, and a load beam that supports the flexure. A configuration in which no load beam is provided is also applicable.

The flexure is needed to secure gimbal function (tracking function of the head above the surface of the magnetic recording medium). In one example, the flexure has a main body part, a support part for the magnetic head slider, and a pair of arm parts that links the main body part and the support part. In order to enhance the gimbal function, it is important to lessen the weight of the signal transmission line mounted on the arm part and the rigidity to enhance deformation performance of the arm part. Therefore, a structure is known in which a separate support part formed of an insulating layer bypassing the outside of the arm part is provided to let the separate support part support the signal transmission line. With this structure, the arm part need not support the signal transmission line, and moreover, an insulating layer for supporting the signal transmission line becomes unnecessary so that reduction in the weight and the rigidity of the arm part is realized.

The above-described configuration can also be applied to the microwave transmission line. Also in this case, the microwave transmission line is supported by the separate support part, so that increase in the weight and the rigidity of the arm parts is suppressed due to the same reason. However, with such configuration, a significant impedance mismatch occurs between a line part supported by the separate support part formed of the insulating layer and a line part supported by the suspension, and therefore a significant transmission loss due to the impedance mismatch occurs at the separate support part. A mismatch loss at the separate support part is not a significant problem when recording/reproducing signals with low frequency are transmitted; however, when signals in microwave frequency bands are transmitted, it is too large to ignore.

An object of the present invention is to provide a suspension that can suppress the effects on the gimbal function and that can realize a microwave signal transmission line that can reduce a transmission loss of microwave signals.

SUMMARY OF THE INVENTION

According to one embodiment of the present invention, a suspension is configured to support a magnetic head slider having a recording head element for recording to a magnetic recording medium and a microwave generating element that applies a high-frequency magnetic field to the magnetic recording medium when recording to the magnetic recording medium is conducted by the recording head element. The suspension includes a flexure that supports the magnetic head slider, and a microwave signal transmission line and a recording signal transmission line that are supported by the flexure. The microwave signal transmission line is connected to the microwave generating element and configured to transmit microwave signals for generating the high-frequency magnetic field, the recording signal transmission line being connected to the recording head element and configured to transmit recording signals. The flexure has a main body part, a support part for the magnetic head slider, and a pair of arm parts that links the main body part and the support part. The recording signal transmission line is supported between the main body part and the support part by a separate support part separated from the flexure, the microwave signal transmission line is supported between the main body part and the support part by at least one of the pair of arm parts, and a portion of the one of the arm parts that supports the microwave signal transmission line has a lamination structure in which an insulating layer that supports the microwave signal transmission line on one surface and a substrate whose portion opposing the other surface of the insulating layer has conductivity are laminated.

The microwave signal transmission line that transmits microwave signals and that receives significant effects of impedance mismatch is supported by the arm part having a conductive substrate, and thereby impedance mismatch is lessened and transmission loss is reduced. On the other hand, the recording signal transmission line that receives slight effects of impedance mismatch is supported by the separate support part and does not pass through the arm part of the suspension, and thereby an increase in the total weight and rigidity of the arm part is prevented and effects on gimbal function can be suppressed.

Therefore, according to the present invention, the suspension that can suppress the effects on the gimbal function and that can realize the microwave signal transmission line that can reduce a transmission loss of microwave signals can be provided.

The above description, as well as other objects, features, and advantages of the present specification will be evident by the detailed description that follows below with reference to attached drawings exemplifying the present specification.

BRIEF DESCRIPTION OF DRAWINGS

FIGS. 3A-3C are plan views and a lateral view of a head gimbal assembly.

FIGS. 4A-4D are schematic views of a configuration of the head gimbal assembly and cross sections thereof.

DETAILED DESCRIPTION OF THE INVENTION

Figure 1:
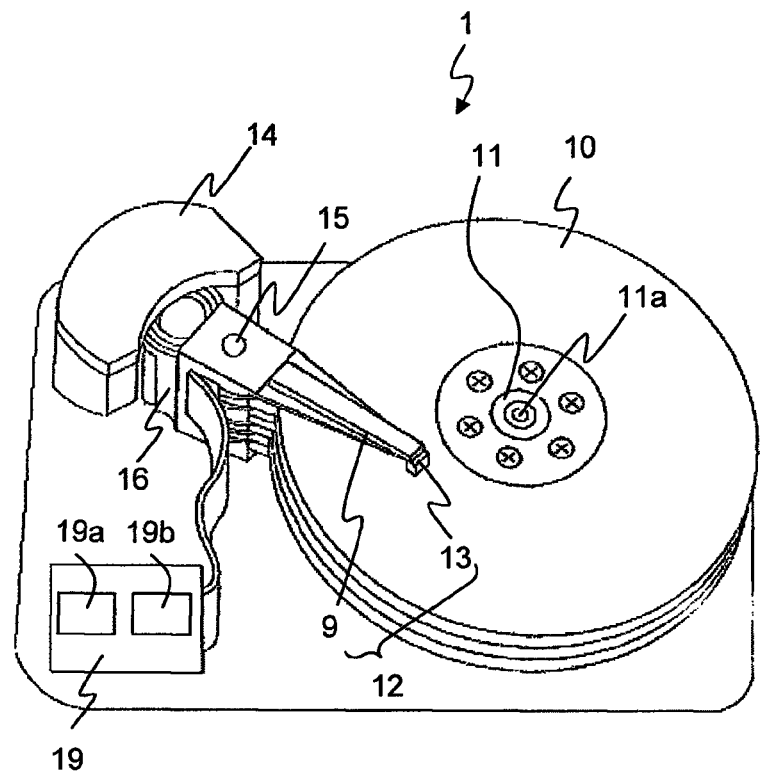
FIG. 1 is a plan view of a magnetic recording device (magnetic disk device).

Hereinafter, descriptions will be given of an embodiment of the present invention with reference to drawings. The dimensions of the configuration elements and the dimensions between the configuration elements in the drawings may differ from the actual configuration for easy viewing in the drawings.

FIG. 1 illustrates a schematic perspective view of a magnetic recording/reproducing device (magnetic disk device). A magnetic recording/reproducing device 1 has a plurality of magnetic recording media (magnetic disks) 10, and a plurality of head gimbal assemblies (HGA) 12 that each includes a magnetic head slider 13. The HGA 12 is configured with the magnetic head slider 13 and a suspension 9 that supports the magnetic head slider 13. The magnetic recording medium 10 rotates around a rotational shaft 11a by a spindle motor 11. The magnetic head slider 13 writes data signals to and reads data signals from the magnetic recording medium 10. In the present invention, the magnetic head slider 13 need only be able to write data signals to the magnetic recording medium 10. The suspension 9 is firmly attached to a carriage 16 that is rotatable around a pivot bearing shaft 15. The suspension 9 conducts positioning of the magnetic head slider 13 above the magnetic recording medium 10 with a voice coil motor (VCM) 14. A recording/reproducing/resonant control circuit 19 controls writing/reading operation of the magnetic head slider 13 and also controls a microwave excitation current for ferromagnetic resonance, which will be described hereinafter. More specifically, the recording/reproducing/resonant control circuit 19 is provided with a microwave signal generation circuit 19a that is connected to microwave signal transmission lines 22c, which will be described hereinafter, and a control unit 19b of the microwave signal generation circuit 19a.

Figure 2:
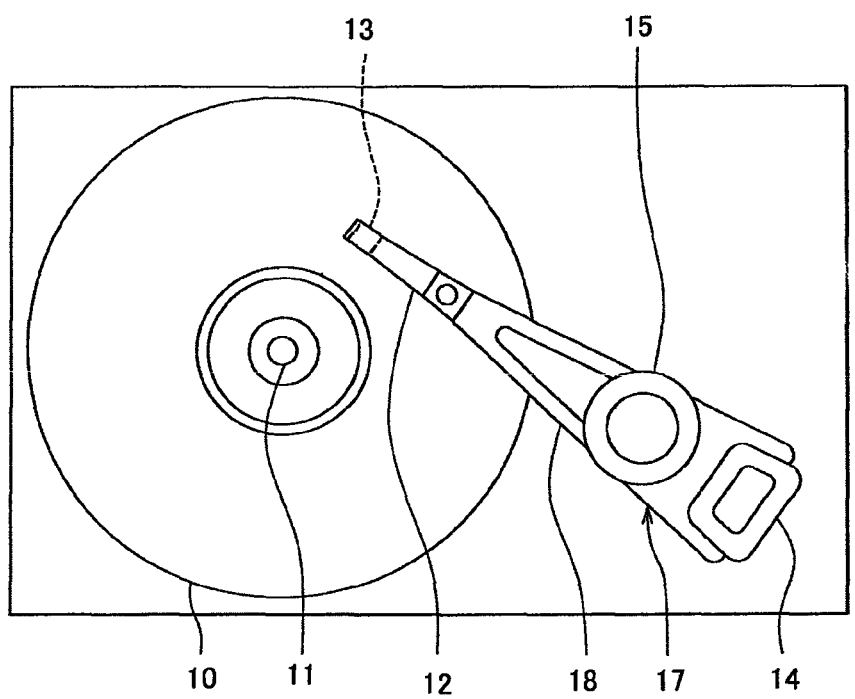
FIG. 2 is a plan view of a head arm assembly.

The HGA 12 may be supported by a drive arm 18 as illustrated in FIG. 2. In this case, a structure in which the HGA 12 and the drive arm 18 are combined may be called a head arm assembly 17. In any one of the configurations of FIG. 1 and FIG. 2, there is no restriction in the number of HGA 12, and only a single piece of the magnetic recording medium 10 and a single piece of the HGA 12 (and a single piece of the drive arm 18) may be provided in the magnetic recording/reproducing device 1. The following description will be given based on the configuration illustrated in FIG. 2.

FIGS. 3A and 3B illustrate a plan view (bottom view viewed from the magnetic recording medium side) and a lateral view of the suspension 9, and FIG. 3C is a partial detail view of a tip end part of the suspension 9 illustrated in FIG. 3A. The suspension 9 has a flexure 21 where the magnetic slider 13 is mounted on one end side thereof and a load beam 20 that presses the magnetic head slider 13 toward the surface of the magnetic recording medium 10 with a prescribed pressure. The flexure 21 is elastically deformable and has a gimbal function of making the magnetic head slider 13 follow the motion of the surface of the magnetic recording medium 10. Transmission lines 22 are formed on the surface of the flexure 21. The flexure 21 is linked to the load beam 20, and the load beam 20 is connected to the drive arm 18 that conducts positioning of the magnetic head slider 13 above the magnetic recording medium.

FIG. 4A is a schematic view of a configuration of the suspension 9 and paths of the transmission lines 22. This drawing is an exploded bottom view of the magnetic head slider 13, the flexure 21, and the load beam 20, which are viewed from the direction A of FIG. 3B. The flexure 21 has a main body part 21a, a support part 21c for the magnetic head slider 13, and a linkage part 21b that links the main body part 21a and the support part 21c. The linkage part 21b is composed of a pair of arm parts 21b, and the arm parts 21b are configured to have lower rigidity compared to the main body part 21a and the support part 21c.

The transmission lines 22 have recording signal transmission lines 22a for transmitting recording signals to a recording head element of the magnetic head slider 13, reproducing signal transmission lines 22b for taking in reproducing output voltage from a reproducing head element, and microwave signal transmission lines (excitation current transmission lines) 22c for transmitting a microwave excitation current. The transmission lines 22 may include, according to the functions of the magnetic head, a heater transmission line for adjusting flying height and a sensor transmission line for detecting flying height (both not illustrated). The transmission lines 22a, 22b, and 22c are typically formed of copper.

As illustrated in FIG. 3C and FIG. 4A, the transmission lines 22a and 22b are supported between the main body part 21a and the support part 21c by separate support parts 24 that are separated from the flexure 21. The microwave signal transmission lines 22c are supported by the pair of arm parts 21b between the main body part 21a and the support part 21c. With this configuration, the weight of the lines supported by the arm parts 21b and the weight of an insulating layer, which becomes needed due to this, can be minimized, and also rigidity of these can be reduced. Therefore, effects to be given to the gimbal function of the arm parts 21b can be lessened. The separation support parts 24 are provided in a manner of extending between the main body part 21a and the support part 21c, so that effects given from the separate support parts 24 to the gimbal function of the arm parts 21b are also lessened.

FIG. 4B illustrates a cross-sectional view along the line A-A of FIG. 4A. The arm part 21b of the flexure 21 has a lamination structure 53 in which a flexure main plate 52 and an insulating layer 50 that supports the microwave transmission line 22c on one surface are laminated in this order. The flexure main plate 52 is formed of a metal, preferably stainless steel. The insulating layer 50 is formed of polyimide, and the microwave signal transmission line 22c is formed on the insulating layer 50. Although not illustrated, a portion between the transmission lines 22a and 22b, and upper surfaces of the transmission lines 22a, 22b, and 22c may be covered by an insulating material such as polyimide as necessary. The entirety of the arm part 21b does not necessarily have the lamination structure 53; at least only the portion of the arm part 21b that supports the microwave signal transmission line 22c needs to have the lamination structure 53. The separation support part 24 is formed with the insulating layer 50 made of an insulating material such as polyimide.

Figure 5A:
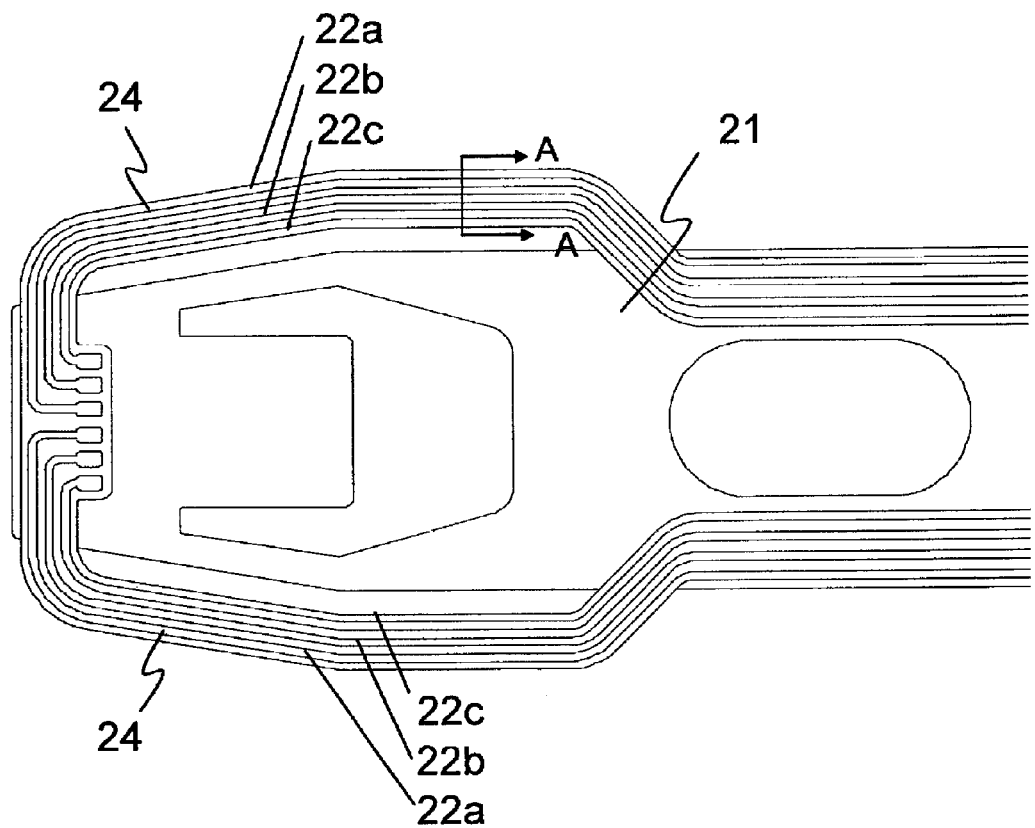
FIGS. 5A and 5B are schematic views of a configuration of the head gimbal assembly, which is a comparison object, and a cross section thereof.
Figure 5B:
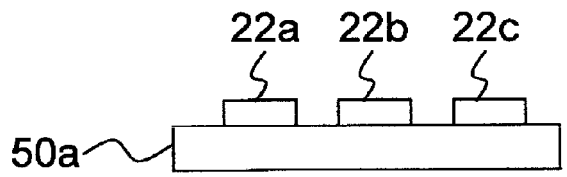

FIG. 5A and FIG. 5B, for comparison, are a plan view and an A-A cross-sectional view of a configuration in which all the transmission lines 22a, 22b, and 22c including the microwave signal transmission line 22c are provided on the separate support parts 24. The transmission lines 22a, 22b, and 22c are supported by an insulating layer 50a made of polyimide, and especially impedance mismatch is significant in the microwave signal transmission line 22c that transmits microwave. Therefore, it becomes difficult to transmit necessary microwave power (electric power) to a microwave generating element 39. On the other hand, in the case of the present embodiment, the flexure main plate 52 made of a metal such as stainless steel functions as a ground of the microwave signal transmission lines 22c, and therefore transmission loss can be suppressed compared to the configuration illustrated in FIGS. 5A and 5B.

FIG. 4C, which is a cross-sectional view along the line A-A of FIG. 4A, illustrates another lamination structure. The arm part 21b of the flexure 21 has a lamination structure 53a in which a flexure main plate 52, a ground layer 51, and an insulating layer 50 that supports the microwave signal transmission line 22c are laminated in this order. The flexure main plate 52 may be formed of a metal such as stainless steel or the like; however, it may also be formed of a resin material with no conductivity. The ground layer 51 is formed of a material, such as, for example, copper, gold, or silver, or an alloy of these, that has higher conductivity than that of the flexure main plate 52. Accordingly, the ground layer 51 with high conductivity functions as a ground for signal transmission in the microwave frequency bands by the microwave signal transmission line 22c. As will be described later, the thickness of the ground layer 51 is preferably 0.1 μm or greater and less than 2 μm.

In the case of transmitting microwave signals with a frequency from approximately 1 GHz to approximately 50 GHz, which is necessary for microwave assistance, transmission loss is significant because the conductivity of stainless is low (1.1-1.4×10⁶ [S/m]) and thereby necessary microwave power may not be supplied to the microwave generating element 39 that is positioned at a tip end of the recording head element. In the present embodiment, the ground layer 51 has higher conductivity than that of the flexure main plate 52 that is typically made of stainless, and therefore transmission loss is further suppressed and microwave power necessary for the microwave generating element 39 can be supplied.

The ground layer 51 is not necessarily formed on the entire surface of the flexure main plate 52, and at least the portion that supports the transmission line 22c need to have the lamination structure 53 illustrated in FIG. 4C. FIG. 4D illustrates an example in which only the portion that supports the microwave signal transmission line 22c has the lamination structure 53a. In that case, the upper surface of the insulating layer 50 that covers the ground layer 51 may be uneven or be planarized as illustrated in the drawing. The width W1 of the ground layer 51 under the microwave transmission line 22c is preferably the same as or greater than the width W2 of the microwave transmission line 22c.

As described above, the configuration of the flexure 21 may be any one of the configurations illustrated in FIGS. 4B-4D, and need only have the lamination structure 53 or 53a in which the insulating layer 50 that supports the microwave signal transmission line 22c on one surface and a substrate 54 whose portion opposing the other surface of the insulating layer 50 has conductivity (in the case of FIG. 4B, the flexure main plate 52 formed of a metal such as stainless steel or the like; in the case of FIGS. 4C and 4D, a stack made with the flexure main plate 52 and the ground layer 51) are laminated.

In FIG. 4A, two lines of the microwave signal transmission lines 22c pass through the pair of arm parts 21b. However, a configuration is considerable in which one of the microwave signal transmission lines 22c is omitted and the microwave generating element 39 is directly grounded to the flexure main plate 52 in the vicinity of an electrode of the microwave generating element 39. In the case, only one line of the microwave signal transmission lines 22c need to be provided. However, in such configuration, the weight and rigidity valance of the pair of arm parts 21b collapses, and this may provide effects to the gimbal function. Therefore, on one of the arm parts 21b on which the microwave signal transmission line 22c is not provided, a single line (or plural lines) other than the microwave signal transmission line can additionally be provided. A type of the line (or types of the lines) can be arbitrarily selected; for example, the transmission lines 22a and 22b, a transmission line for a heater, a transmission line for a sensor that detect flying height, and a dummy line that transmits no signals.

In order not to worsen the gimbal function, it is preferred that the lamination structures, weight distributions, rigidity, and line paths of both of the arm parts 21b correspond to each other to the extent possible, and it is further preferred that they are line-symmetric with respect to the longitudinal direction center axis L-L of the flexure 21. Also in the case when two lines of the microwave signal transmission lines 22c pass through the pair of arm parts 21b, it is preferred that lamination structures, weight distributions, rigidity, and paths of the two lines of the microwave signal transmission lines 22c of both of the arm parts 21b are line-symmetric with respect to the longitudinal direction center axis L-L of the flexure 21.

Figure 6:
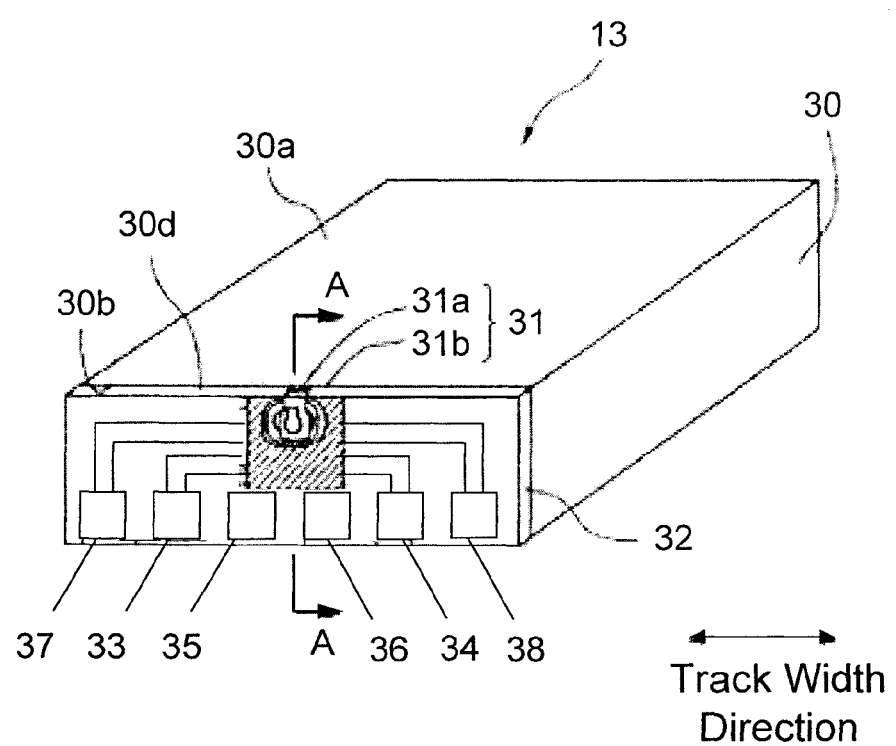
FIG. 6 is a schematic perspective view of a magnetic head slider.

FIG. 6 is a perspective view schematically illustrating the entirety of the magnetic head slider 13 of the present embodiment. The magnetic head slider 13 is provided with a magnetic head slider substrate 30 having an air bearing surface (ABS) 30a that has been processed so as to obtain a suitable flying height, a magnetic head element 31 provided on an element formation surface 30b that is perpendicular to the ABS 30a, a protective part 32 provided on the element formation surface 30b so as to cover the magnetic head element 31, and six terminal electrodes 33, 34, 35, 36, 37, and 38 that are exposed from the surface of the protective part 32. The positions of the terminal electrodes 33, 34, 35, 36, 37, and 38 are not limited to the positions illustrated in FIG. 6, and they may be provided in any arrangement and in any positions on the element formation surface 30b. When a heater and/or a sensor are provided, a terminal electrode that is electrically connected to them is provided.

The magnetic head slider 13 is mainly configured with a magneto-resistive effect (MR) reproducing head element 31a for reading data signals from the magnetic recording medium, and a recording head element 31b for writing data signals to the magnetic recording medium. The terminal electrodes 33 and 34 are electrically connected to the MR reproducing head element 31a, the terminal electrodes 37 and 38 are electrically connected to the recording head element 31b, and the terminal electrodes 35 and 36 are electrically connected to the microwave generating element 39 (FIG. 8), which will be described hereinafter.

Tip ends of the transmission lines 22a, 22b, and 22c on the magnetic head slider 13 side are respectively connected to terminal electrodes of the recording head element 31b, the reproducing head element 31a, and the microwave generating element 39 by ball bonding in the present embodiment. Also, the transmission lines 22a, 22b, and 22c may respectively be connected to the terminal electrodes by wire bonding instead of ball bonding.

In the MR reproducing head element 31a and the recording head element 31b, the respective end parts of the elements are positioned on the ABS 30a (more specifically, on a magnetic head slider end surface 30d of the ABS 30a). When one end of the MR reproducing head element 31a and one end of the recording head element 31b oppose the magnetic recording medium, reproduction of data signals by sensing a signal magnetic field and recording of data signals by applying a signal magnetic field are conducted. An extremely thin diamond-like carbon (DLC) or the like is coated for protection on the respective end parts of the elements on the ABS 30a and its vicinity.

Figure 7:
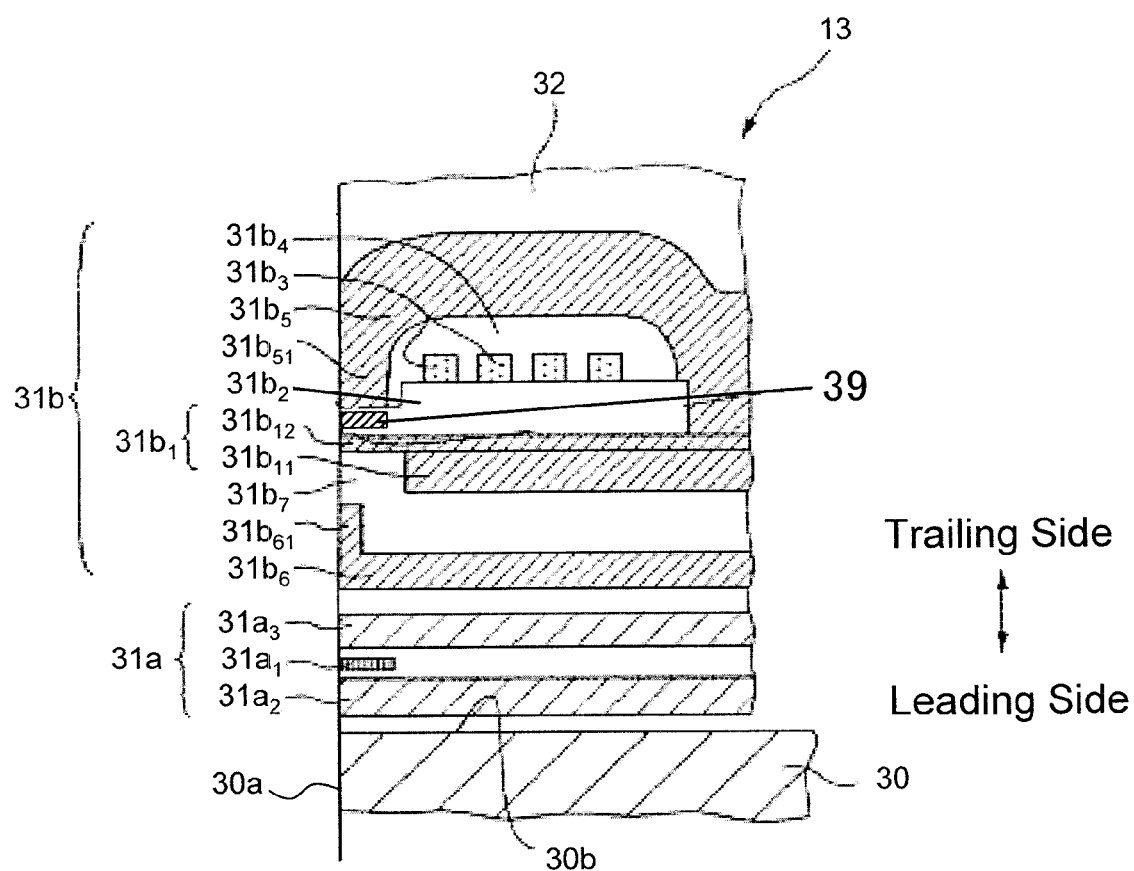
FIG. 7 is a cross sectional view of the magnetic head slider.

FIG. 7 is a cross-sectional view along the line A-A of FIG. 6. The MR reproducing head element 31a, the recording head element 31b, the microwave generating element 39, and the protective part 32 that protects these elements, are mainly formed above the element formation surface 30b of the magnetic head slider substrate 30 made of ALTIC ($Al_2O_3$—TiC).

The MR reproducing head element 31a includes an MR stack $31a_1$, and a lower shield layer $31a_2$ and an upper shield layer $31a_3$ that are arranged in a position to sandwich the stack. The MR stack $31a_1$ is composed of a current-in-plane (CIP) GMR multilayer film, a current-perpendicular-to-plane (CPP) GMR multilayer film, or a TMR multilayer, and senses a signal magnetic field from the magnetic recording medium. The lower shield layer $31a_2$ and the upper shield layer $31a_3$ prevent effects from external magnetic fields, which would be noise for the MR stack $31a_1$.

The recording head element 31b has a configuration for perpendicular magnetic recording. More specifically, the recording head element 31b is provided with a main pole layer $31b_1$, a trailing gap layer $31b_2$, a writing coil $31b_3$ formed in a manner of passing between the main pole layer $31b_1$ and an auxiliary pole layer $31b_5$, a writing coil insulating layer $31b_4$, the auxiliary pole layer $31b_5$, an auxiliary shield layer $31b_6$, and a leading gap layer $31b_7$. The main pole layer $31b_1$ is a main pole of the recording head element 31b, and generates a writing magnetic field from an end part of the ABS 30a side of the main pole layer $31b_1$ at the time of writing data signals.

The main pole layer $31b_1$ is a magnetic guide path. The magnetic guide path guides a magnetic flux, while letting the magnetic flux focus, to a magnetic recording layer of the magnetic recording medium. Herein, the magnetic flux is generated by applying a write current to the writing coil $31b_3$, and the magnetic recording layer is a layer to which writing is conducted. The main pole layer $31b_1$ is configured with a main pole yoke layer $31b_{11}$ and a main pole major layer $31b_{12}$.

The auxiliary pole layer $31b_5$ and the auxiliary shield layer $31b_6$ are arranged respectively in the trailing side and the leading side of the main pole layer $31b_1$.

The end parts of the ABS 30a sides of the auxiliary pole layer $31b_5$ and the auxiliary shield layer $31b_6$ are respectively a trailing shield part $31b_{51}$ and a leading shield part $31b_{61}$ that each has a wider layer cross section than the other portions. The trailing shield part $31b_{51}$ opposes the end part of the ABS 30a side of the main pole layer $31b_1$ through the trailing gap layer $31b_2$ therebetween. Further, the leading shield part $31b_{61}$ opposes an end part of a magnetic head slider end surface 30d side of the main pole layer $31b_1$ through the leading gap layer $31b_2$ therebetween. By providing the trailing shield part $31b_{51}$ and the leading shield part $31b_{61}$ that are described above, a magnetic field gradient of a recording magnetic field between the end part of the trailing shield part $31b_{51}$ and the end part of the main pole layer $31b_1$ and between the end part of the leading shield part $31b_{61}$ and the end part of the main pole layer $31b_1$ becomes even steeper due to a magnetic flux shunt effect. As a result, signal output jitter is diminished, and thereby an error rate at the time of reading can be diminished.

It is also possible to provide a so-called side surface shield by suitably processing the auxiliary main pole layer $31b_5$ or the auxiliary shield layer $31b_6$ and arranging a portion of the auxiliary main pole layer $31b_5$ or the auxiliary shield layer $31b_6$ near both sides of the main pole layer $31b_1$ in the track width direction. In this case, the magnetic flux shunt effect is enhanced.

The microwave generating element 39 is formed between the main pole major layer $31b_{12}$ of the main pole layer $31b_1$ and the trailing shield part $31b_{51}$ of the auxiliary pole layer $31b_5$.

Figure 8:
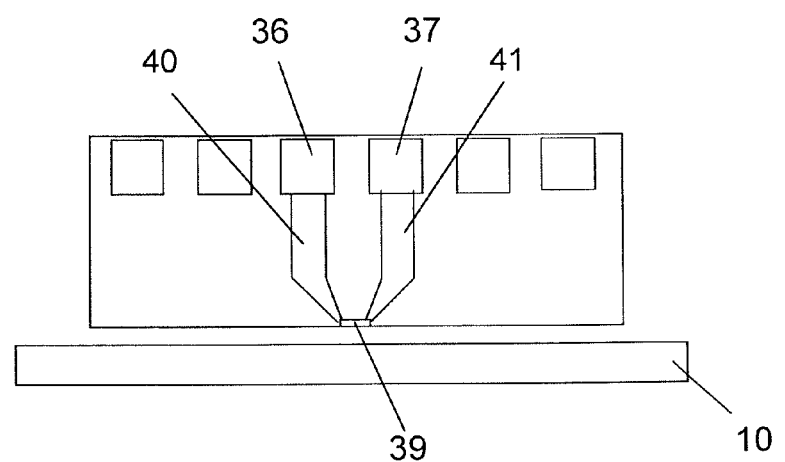
FIG. 8 is a schematic view of a structure of a microwave generating element.

FIG. 8 is a drawing of a configuration of the microwave generating element viewed from the element formation surface 30b of the magnetic head slider 13. The microwave generating element 39 exposed to the ABS surface of the magnetic head slider 13 and the terminal electrodes 36 and 37 are electrically connected by wiring members 40 and 41, and the microwave generating element 39 generates a microwave magnetic field by supplying a microwave excitation current from the terminal electrodes to apply the microwave magnetic field to the adjacent magnetic recording medium 10.

Figure 9:
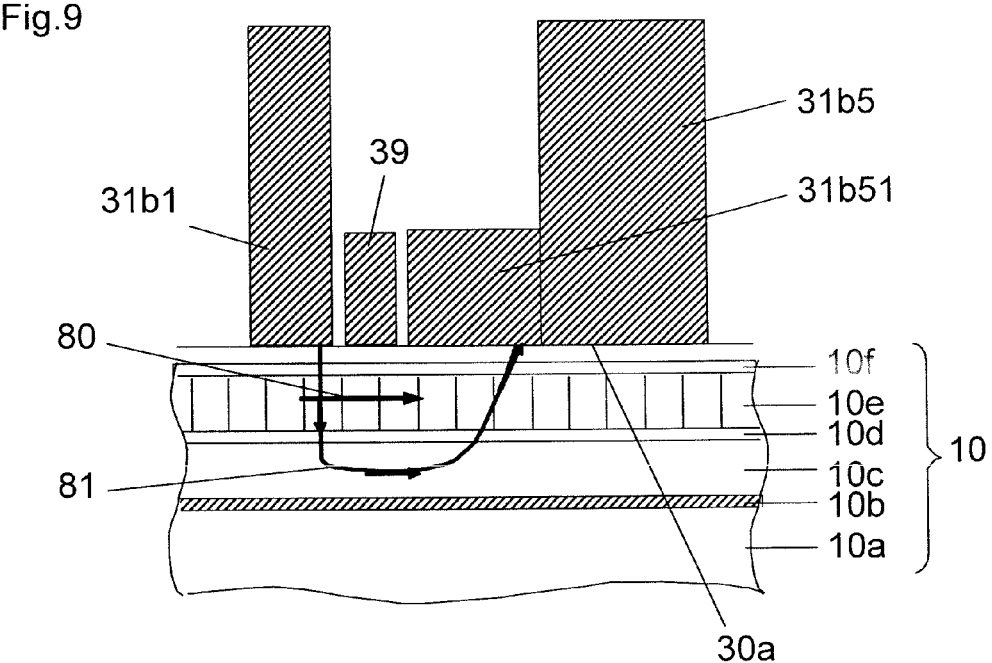
FIG. 9 is a schematic view for explaining the principle of a microwave assisted magnetic recording method.

FIG. 9 is a cross-sectional view for explaining the principle of the microwave assisted magnetic recording method. The magnetic recording medium 10 is for perpendicular magnetic recording, and has a multilayered structure in which a magnetization orientation layer 10b, a soft magnetic under layer 10c that functions as a part of the magnetic flux loop circuit, an intermediate layer 10d, a magnetic recording layer 10e, and a protective layer 10f are sequentially laminated above a disk substrate 10a.

The magnetization orientation layer 10b stabilizes a magnetic domain structure of the soft magnetic under layer 10c to enhance suppression of spike noise in the reproducing output waveform by applying magnetic anisotropy in the track width direction to the soft magnetic under layer 10c. The intermediate layer 10d functions as a base layer that controls magnetization orientation and particle size of the magnetic recording layer 10e.

The ferromagnetic resonant frequency FR of the magnetic recording layer 10e is an inherent value determined by shape, size, configuration elements, and the like of magnetic particles that configure the magnetic recording layer 10e; however, generally it is approximately 10-50 GHz.

A microwave magnetic field is generated in the periphery of the microwave generating element 39 by applying a microwave excitation current to a conductor that configures the microwave generating element 39. A resonant magnetic field 80 is applied in a substantially in-plane direction of the magnetic recording medium within the magnetic recording medium because the microwave generating element 39 is adjacent to the magnetic recording medium. The resonant magnetic field 80 is a high-frequency magnetic field in the microwave frequency bands having the ferromagnetic resonant frequency FR of the magnetic recording layer 10e of the magnetic recording medium 10 or a frequency close to the ferromagnetic resonant frequency FR.

The coercive force of the magnetic recording layer 10e can be efficiently reduced by applying the resonant magnetic field 80 in a superimposition manner to a perpendicular recording magnetic field 81 that is applied to the magnetic recording layer from the main pole layer 31b1 of the recording head element 31b. As a result, the intensity of the writing magnetic field in the perpendicular direction (perpendicular or substantially perpendicular direction to a top layer surface of the magnetic recording layer 10e), the writing magnetic field being necessary for writing, can significantly be reduced. When the coercive force is reduced, magnetization reversal is more likely to occur. Thereby recording can efficiently be conducted with a small recording magnetic field.

Next, microwave frequency dependency of transmission loss was calculated for various microwave transmission lines. FIG. 4B illustrates a cross section of a transmission line on an arm part of an example. In the example, in the arm part, an insulating layer 50 (thickness of approximately 10 μm) made of polyimide and a transmission line 22c (thicknesses of approximately 12 μm) made of Cu were formed on a flexure main plate 52 (thickness of approximately 18 μm) made of stainless (conductivity of $1.1 \times 10^6$ [S/m]). A comparative example had a conventional configuration that the flexure main plate 52 was removed from the example. In the example, the flexure main plate 52 functioned as a ground. In the comparative example, no layer functioning as a ground was provided. It was assumed in the following analysis that only one micro transmission line was formed on the insulating layer. The length of the microwave transmission line 22c on the arm part was set at 1.5 mm.

Figure 10:
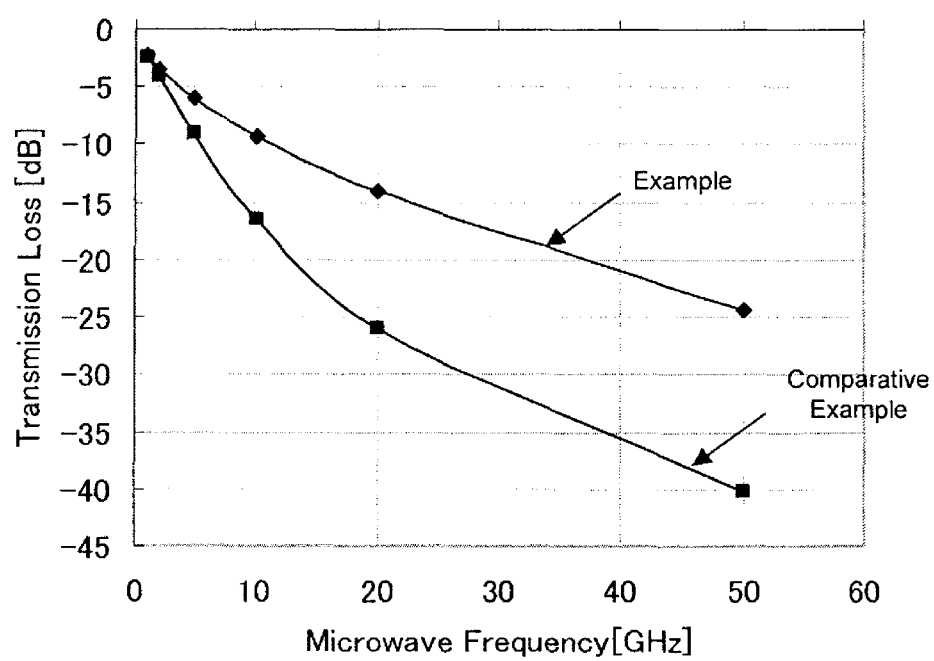
FIG. 10 illustrates loss simulation of transmission lines (flexure main plate made of stainless steel).

FIG. 10 illustrates the transmission loss of microwave signals in the frequency region of 1-50 GHz. The transmission loss was significantly improved in the example compared to the comparative example. While the transmission loss in the comparative example was approximately 32 dB at 30 GHz, it was improved to approximately 17 dB in the example.

Figure 11:
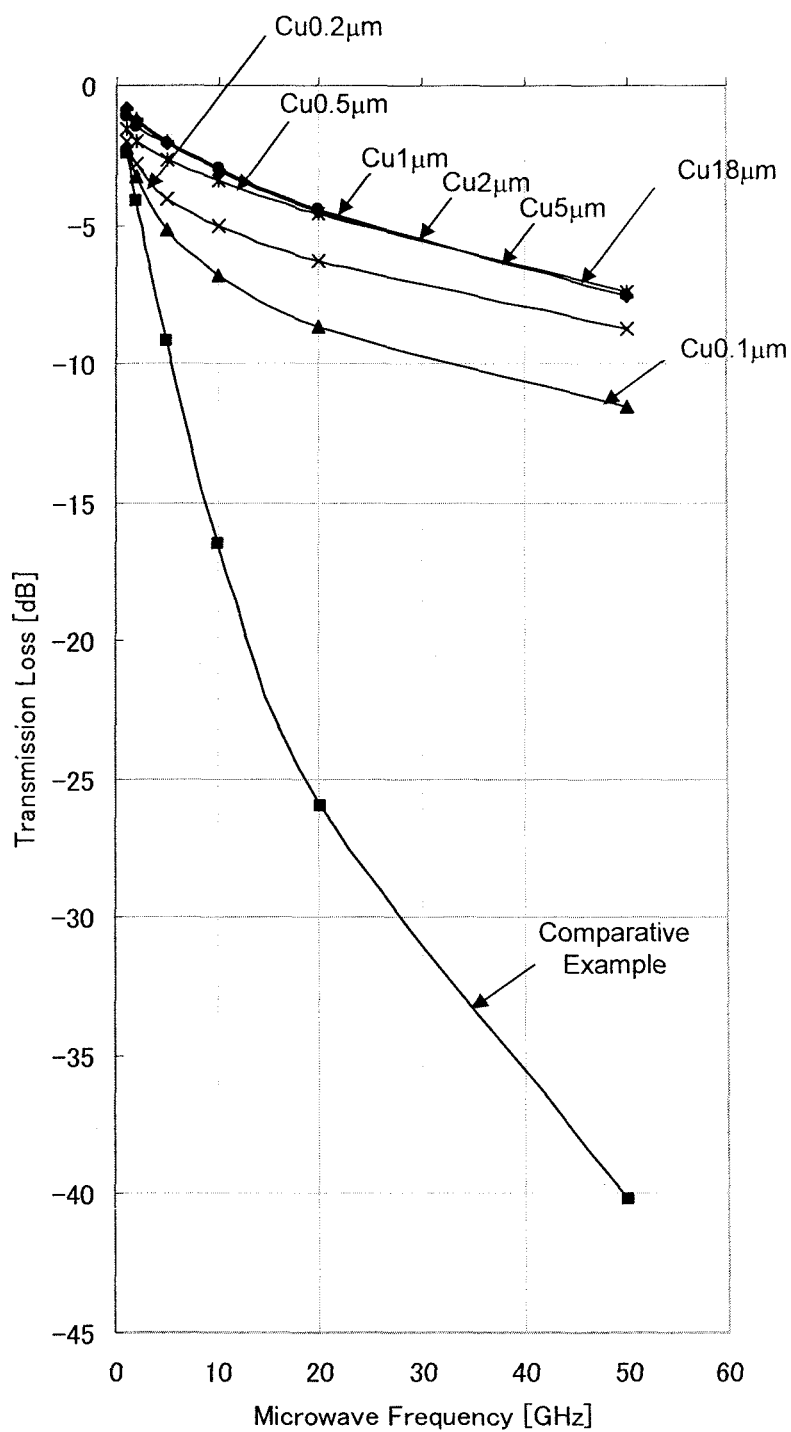
FIG. 11 illustrates loss simulation of transmission lines (Cu ground layer).

FIG. 11 illustrates the transmission loss of microwave signals in the example (the configuration of the left drawing of FIG. 4C) in which a ground layer was provided on the entirety of a flexure main plate. Illustrated are the transmission loss of the case when the flexure main plate 52 itself was made of Cu (Cu 18 μm), the case when the ground layer 51 made of Cu with various thicknesses (Cu 0.1 μm-Cu 5 μm) was provided on the flexure main plate 52 made of stainless, and the case when the flexure main plate 52 was formed of stainless and the ground layer 51 was not provided (comparative example). Providing the ground layer made of Cu or making the flexure main plate 52 itself of Cu significantly improved the transmission loss compared to the comparative example. While the transmission loss in the comparative example was approximately 32 dB at 30 GHz, it was improved to approximately 6-10 dB in the example. A distinct loss improvement was observed when the thickness of the ground layer was 0.1 μm or greater. Accordingly, 0.1 μm can be considered as the lower limit of the thickness of the ground layer. When the thickness of the ground layer was 2 μm or 5 μm, transmission loss characteristics thereof almost completely matched the case of Cu 18 μm. In other words, when the film thickness was 2 μm or greater, the maximum improvement effects was obtained, and the improvement effects were saturated. Meanwhile, in order to minimize the effect on the spring characteristics of the flexure from the viewpoint of the gimbal function, the thickness of the ground layer formed on the flexure main plate is preferably as thin as possible. Accordingly, the thickness of the ground layer is preferably less than 2 μm.

As described above, the thickness of the ground layer made of Cu formed on the flexure main plate is preferably 0.1 μm or greater and less than 2 μm.

Figure 12:
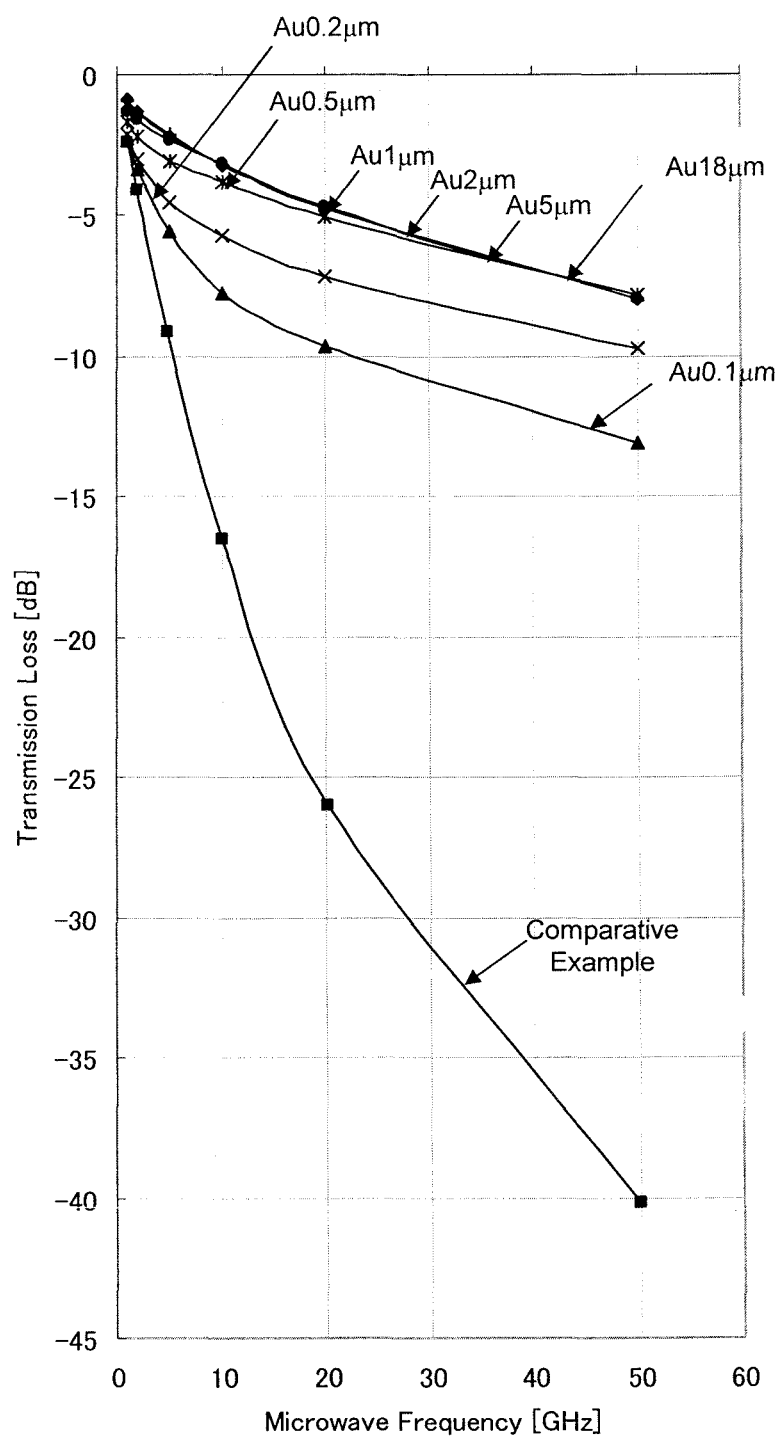
FIG. 12 illustrates loss simulation of transmission lines (Au ground layer).

FIG. 12 illustrates the microwave transmission loss when Au having different conductivity from Cu was used as a ground layer. Except for that the material of the ground layer is different, FIG. 12 is the same as the FIG. 11. A distinct loss improvement was also observed in this case when the thickness of the ground layer is 0.1 μm or greater. When the thicknesses of the ground layer was 2 μm or 5 μm, transmission loss characteristics thereof almost completely matched the case of Au 18 μm. Accordingly, the thickness of the ground layer made of Au formed on the flexure main plate 52 is preferably 0.1 μm or greater and less than 2 μm.

According to the present results, it is evident that transmission characteristics are improved by providing a ground layer with a higher conductivity than that of the flexure main plate regardless of material type thereof. The material of the ground layer can be suitably selected from the viewpoint of processing, cost, and the like.

According to the embodiment described above, the suspension is configured from the flexure and the load beam, and the load beam functions to press the magnetic head slider against the surface of the magnetic recording medium with a prescribed pressure. On the other hand, the flexure may also functions as described above by adjusting the thickness, the material type, and the shape of the flexure. For example, it is possible to have the shape in which the width of the flexure becomes gradually wider toward the mounting direction of a drive arm 18. It is evident that similar effects can be obtained from a suspension configured only with such a flexure.

Several preferable embodiments of the present invention have been illustrated and described in detail; however, it is understood that various changes and modifications can be made without departing from the essence and scope of the attached claims.

What is claimed is:

1. A suspension that is configured to support a magnetic head slider having a recording head element for recording to a magnetic recording medium and a microwave generating element that applies a high-frequency magnetic field to the magnetic recording medium when recording to the magnetic recording medium is conducted by the recording head element, the suspension being configured to be supported by a drive arm that conducts positioning of the magnetic head slider above the magnetic recording medium, comprising:
- a flexure that supports the magnetic head slider; and a microwave signal transmission line and a recording signal transmission line that are supported by the flexure, the microwave signal transmission line being connected to the microwave generating element and configured to transmit microwave signals for generating the high-frequency magnetic field, the recording signal transmission line being connected to the recording head element and configured to transmit recording signals, wherein
- the flexure has a main body part, a support part for the magnetic head slider, and a pair of arm parts that links the main body part and the support part,
- the recording signal transmission line is supported along a first route by (i) the main body part, (ii) a separate support part that connects the main body part and the support part for the magnetic head slider and that extends between the main body part and the support part separately from the pair of the arm parts of the flexure, and (iii) the support part,
- the microwave signal transmission line is supported along a separate route different from the first route by (i) the main body part, (ii) at least one of the pair of arm parts and (iii) the support part for the magnetic head slider,
- the separate support part extends parallel to and is spaced apart from the pair of the arm parts of the flexure, and
- a portion of the one of the arm parts that supports the microwave signal transmission line has a lamination structure in which an insulating layer that supports the microwave signal transmission line on one surface and a substrate whose portion opposing the other surface of the insulating layer has conductivity are laminated.

2. The suspension according to claim 1, wherein the microwave signal transmission line is configured to transmit microwave signals of 1-50 GHz.

3. The suspension according to claim 1, wherein one of the arm parts supports one line of the microwave transmission line and the other one of the arm parts supports another line of the microwave transmission line, the recording signal transmission line, a reproducing signal transmission line that is connected to a reproducing head element for reproducing data signals from the magnetic recording medium and that transmits reproducing signals, or a dummy line, so that the lamination structures, weight distributions, and rigidity of both of the arm parts are nearly symmetric with respect to a longitudinal direction center axis of the suspension.

4. The suspension according to claim 1, wherein the substrate is a flexure main plate that has conductivity.

5. The suspension according to claim 4, wherein the substrate is the flexure main plate made of stainless steel.

6. The suspension according to claim 4, wherein the substrate is the flexure main plate with higher conductivity than that of stainless steel.

7. The suspension according to claim 1, wherein the substrate has a lamination structure in which a flexure main plate and a ground layer that is positioned between the flexure main plate and the insulating layer and that has higher conductivity than that of the flexure main plate are laminated.

8. The suspension according to claim 7, wherein the ground layer has a thickness of 0.1 μm or more and less than 2 μm.

9. The suspension according to claim 7, wherein the flexure main plate is formed of stainless steel, and the ground layer is formed of copper, gold, or silver, or an alloy of these.

10. The suspension according to claim 1, further comprising:
- a load beam connected to the drive arm that conducts positioning of the magnetic head slider above the magnetic recording medium; and
- a flexure that is linked to the load beam and that supports the magnetic head slider.

11. The suspension according to claim 1, wherein the flexure is connected to the drive arm that conducts positioning of the magnetic head slider above the magnetic recording medium.

12. A head gimbal assembly, comprising:
the suspension according to claim 1 and the magnetic head slider.

13. A magnetic recording device, comprising:
the head gimbal assembly according to claim 12;
a microwave signal generation circuit connected to the microwave signal transmission line; and
a control part of the microwave signal generation circuit.

* * * * *